Oct. 9, 1934.  I. H. PRITCHETT  1,976,091
PROCESS FOR PREPARING MEANS FOR MELLOWING BEVERAGES
Filed March 27, 1933   2 Sheets-Sheet 1
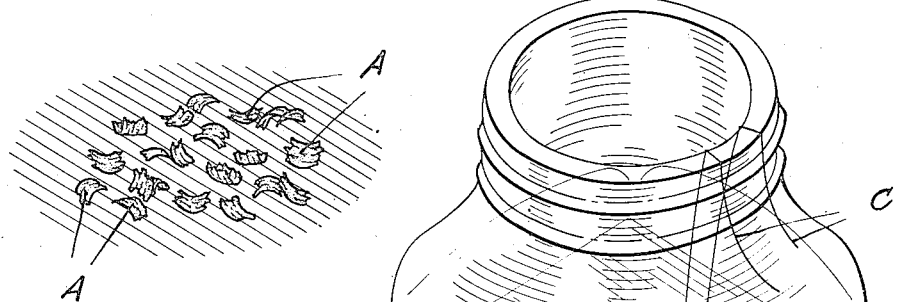
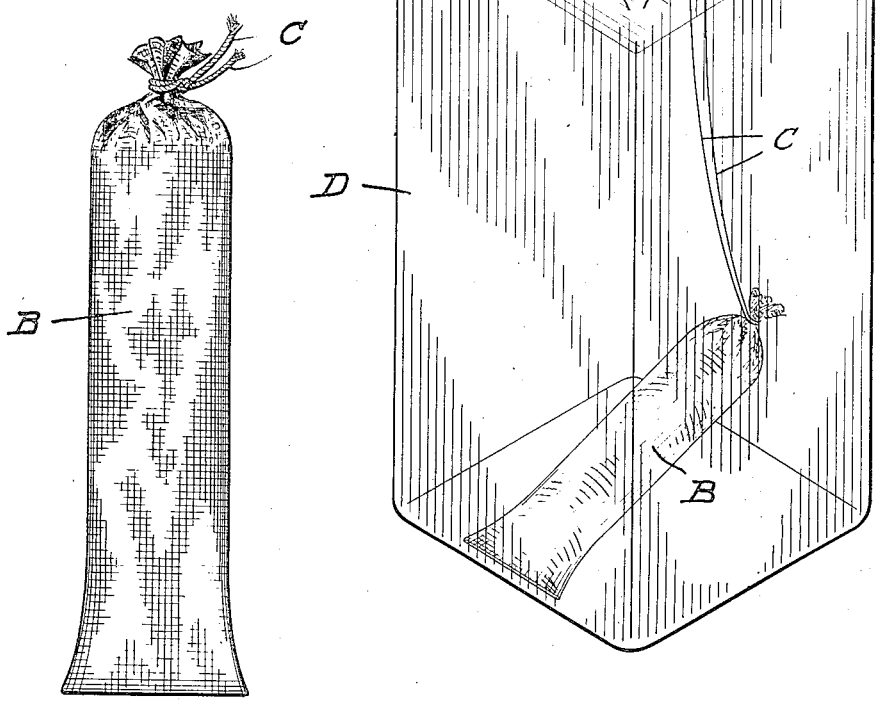
Inventor
IRVING H. PRITCHETT
By Lester L. Sargent
Attorney

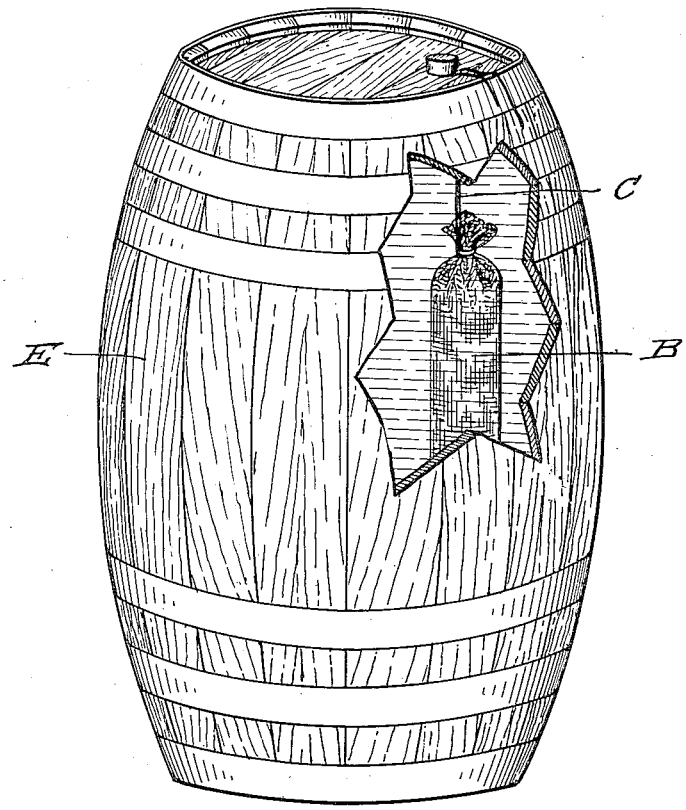

Patented Oct. 9, 1934

1,976,091

UNITED STATES PATENT OFFICE 1,976,091

PROCESS FOR PREPARING MEANS FOR MELLOWING BEVERAGES

Irving H. Pritchett, Petersburg, Va.

Application March 27, 1933, Serial No. 663,046

2 Claims. (Cl. 202—78)

The object of my invention is to provide a new and better process for quickly mellowing beverages whereby to improve their color and flavor, and at less expense than is involved in the conventional process for aging beverages in charred kegs and barrels; and to provide a novel means for packaging the produce of this process whereby it may be conveniently used by the purchaser. I attain these and other objects of my invention by the process hereinafter described.

Figure 1 is an elevational view of the baked chips which I have invented or treated in accordance with my invention;

Fig. 2 is a side elevation of a fabric container for the chips for conveniently using the chips in mellowing beverages; and Fig. 3 is a perspective view of a jar of beverage with a bag of the chips placed therein to mellow same.

Fig. 4 is a perspective view of a keg with a portion thereof broken away to show the manner of using the invention in a container of that character.

Like numerals designate like parts in each of the views.

Referring to the accompanying drawings, the chips A are obtained by the following process: Green white oak timber is the material from which the chips are produced. The outside sap wood is removed first. Second, the timber must be green when used. The heart wood is then shaved into thin shavings or chips by suitable planes which may be either mechanically or manually operated.

I use the green heart white oak wood because it contains more of the ingredients that are useful and desired in ageing spirituous liquors and other beverages than the seasoned white oak wood contains, because the seasoned wood has lost a great deal or share of these ageing qualities, substances or ingredients through evaporation. The green white oak outside or sap wood contains the chemicals or principles necessary for ageing in much more diluted form than the center or heart. That is, in equal weights of sapwood and center or heart there is considerably more ageing principle in the center or heart than in the outside or sapwood. The center or heart of the green white oak also contains less tannic acid, which is an astringent. The center or heart of the wood therefore is less injurious to the human system than the outside or sapwood of the green white oak.

These chips are placed in a container which is practically an airtight oven, and baked for a period of 20 to 30 minutes at a temperature ranging from 700 to 800 degrees Fahr., that is, until the wood is thoroughly cooked or charred but not to a carbon state. These shavings, chips or particles are cooked to a point that is highly destructive of what tannic acid may be found in them when green, and therefore nearly eliminates this astringent. The purpose of the airtight oven is to retain all of the chemicals contained in the remaining green white oak wood after removal of the outer layer of sapwood. The baking of the shavings or chips in high temperature and in closed containers brings about the desired condition in the shavings or chips quickly and thus a minimum amount of the chemicals, qualities, substances or ingredients that cause ageing are decomposed. The elimination of oxygen prevents the oxidation and thus destruction of the chemicals or principles that cause ageing. The advantage in using a larger absorbing surface is provided for contact with the liquids. As a result of the enlarged surface exposed to the liquid the time for ageing a beverage is shortened to a period of two or three days at the most.

It has been the practice hitherto to char barrels or kegs and to allow spirituous or vinous beverages to remain in such charred barrels or kegs for a considerable period to age or mellow the beverage. To char the barrels or kegs is quite an expense in itself, which is avoided by my process. The oak chips treated as described above will give any kind of beverage, alcoholic or non-alcoholic, an oak flavor, and at the same time tend to remove the fusel oil in alcoholic beverages, such as wine or whiskey, and will accomplish this result within a relatively short time, namely a period of from twelve hours to two or three days.

This process when applied to beverages will disclose if there are any foreign substances added in the manufacturing thereof, such as lye, impure water or redistilled or denatured alcohol. If applied to redistilled, denatured alcohol the beverage will turn dark. If applied to beverages in which lye has been used in the manufacturing it will turn yellowish green.

The oak chips after being baked as above described are placed in suitable containers for delivery and use. For this purpose I provide elongated fabric bags B in which a specified quantity of the chips, appropriate to a predetermined quantity of beverage, is placed; the open end of the bag tied with a suitable cord, C a suitable length of which is left hanging free to facilitate placing the bag of chips in the container of liquid D for the period described and to permit of its convenient removal therefrom. I may also pack the chips in pasteboard cartons, from which they are poured into the beverage, and the beverage drained off from the first container in which the oak chips have been placed to a second container after the prescribed period. For kegged beverages some users may prefer the loose chips. The color and flavor process may successfully be used for vinegar, cider, grape juice and other non-alcoholic, or alcoholic beverages. It imparts a deep amber color and the oak flavor above described. A half pound box of the chips represents the proper amount for a five gallon keg of beverage. The chips after being baked as described are of a deep brown color.

What I claim is:

1. A process for preparing means for mellowing beverages, consisting in removing the outside sap wood from green white oak timber, shaving the remaining heart wood of the timber into chips, and baking the chips at a temperature sufficiently high to char but not to carbonize the chips and in a practically airtight oven, to eliminate astringents and other injurious ingredients.

2. A process for preparing means for mellowing beverages, consisting in removing the sap wood from green white oak timber, shaving the remaining wood of the timber into chips, baking the chips in a substantially airtight oven for a period of 20 to 30 minutes at a temperature ranging from 700 degrees to 800 degrees Farenheit, to eliminate astringents and other injurious ingredients.

IRVING H. PRITCHETT.